Aug. 23, 1949.
A. COX
2,479,907
OPTICAL OBJECTIVE HAVING A FRONT MEMBER
CORRECTING SPHERICAL ABERRATION, FIELD
CURVATURE, AND DISTORTION
Filed May 31, 1946
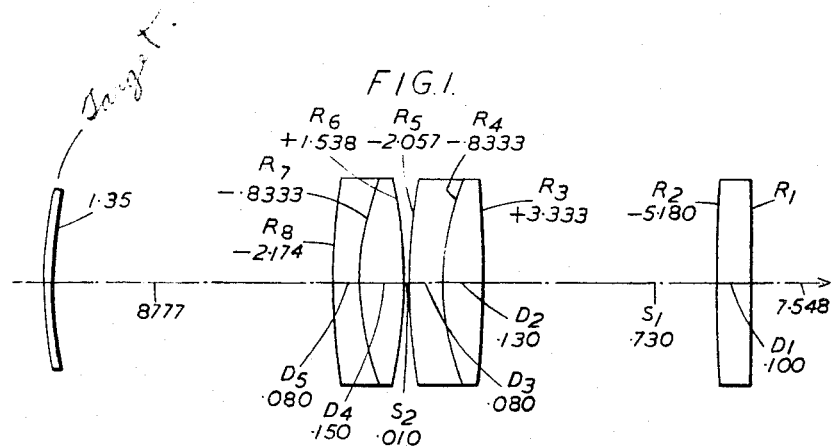
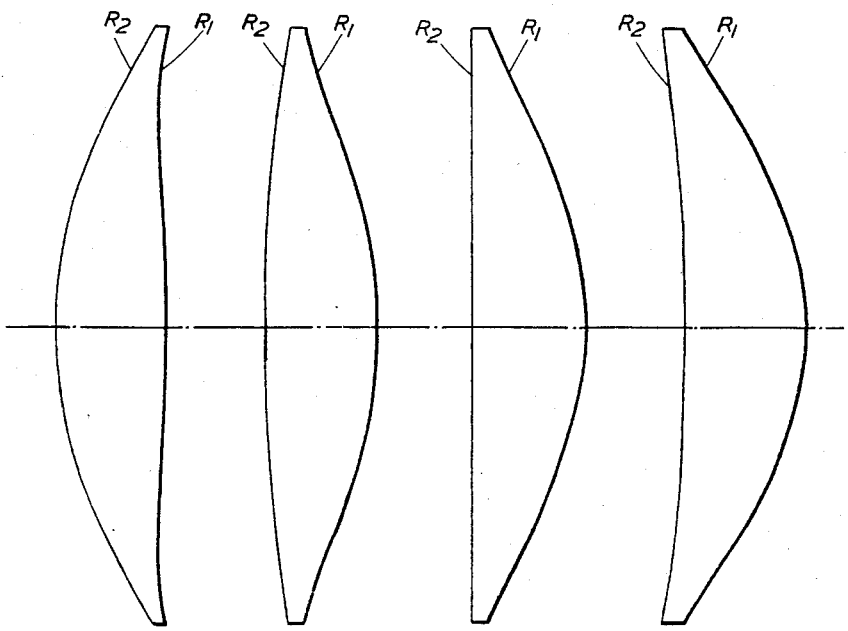
Inventor
ARTHUR COX
By
Emery Holcombe & Blair
Attorney Patented Aug. 23, 1949

2,479,907

UNITED STATES PATENT OFFICE 2,479,907

OPTICAL OBJECTIVE HAVING A FRONT MEMBER CORRECTING SPHERICAL ABERRATION, FIELD CURVATURE, AND DISTORTION

Arthur Cox, Leicester, England, assignor to Taylor, Taylor & Hobson Limited, Leicester, England, a company of Great Britain Application May 31, 1946, Serial No. 673,304
In Great Britain April 3, 1946

10 Claims. (Cl. 88—57)

This invention relates to optical objectives intended especially (though not exclusively) for the optical projection on to a screen of the images formed by electrical scanning on suitable targets in cathode ray tubes, as used for television reception. Such images may be formed on curved targets and may, by suitable electrical means, be given any reasonable degree of distortion. This makes it possible to utilise such electrical means in conjunction with the shape of the target to contribute towards the correction of field curvature and distortion in the resultant image projected on to the screen, thereby simplifying the design of the objective itself.

The invention has for its object to provide an objective well-corrected for the other primary aberrations for a relatively high aperture of, say, F/1.4, and covering a reasonable angular field, of say, 32 degrees.

To this end, the objective according to the invention is corrected for spherical and chromatic aberrations, coma and astigmatism, and comprises two members separated by an air space lying between .40 and 1.20 times the equivalent focal length of the rear member, the rear member consisting of a pair of achromatic doublets separated by an air space lying between 0 and .10 times such focal length, whilst the front member consists of a simple element having one surface slightly aspherical.

It should be made clear that the terms "front" and "rear" are herein used, in accordance with the usual convention, to relate to the sides of the objective respectively nearer to and further from the longer conjugate, so that when used for projection the light passes through the objective from the rear to the front.

The aspherical surface of the simple front member is constituted by a surface of revolution generated by the rotation about the $y$-axis, that is the optical axis of the objective, of a curve of the form $$y = ax^2 + bx^4 + cx^6 + \ldots + \text{higher even powers of } x$$

wherein the coefficients $a, b, c \ldots$ are constants and determine the degree of departure of the surface from true spherical form, the term "spherical" being used to include a sphere of infinite radius, that is a plane surface. It will, in fact, usually be most convenient in practice for the aspherical surface to consist of a figured plane surface, the figuring (that is, the departure of the surface from the true plane) being small at all radial distances from the axis.

In the neighbourhood of the optical axis, the simple front member is preferably convergent with a focal length greater than 4.0 times that of the rear member. The Abbè V number of the material used for the front member is preferably not less than 45.

It is not essential to the invention for the co-operating internal contact surfaces in each of the two doublets to be cemented or to have exactly the same radius of curvature, but such surfaces (whether cemented or not) are preferably concave to the front in each doublet. Conveniently, each doublet consists of a convergent biconvex element in front of a meniscus divergent element made of a material having greater mean refractive index and lower Abbè V number than that of the associated convergent element. The Abbè V number of the material used for the convergent element preferably exceeds that of the associated divergent element by more than 20.

A preferred practical example of objective according to the invention and some modifications thereof are illustrated in the accompanying drawings, in which Figure 1 shows the preferred objective with the target object indicated in position on the left-hand side, the projection screen being far beyond the right-hand edge of the paper, Figure 1a is an enlarged view of the front member of the objective, the horizontal scale of the drawing being shown many times larger than the vertical scale in order to give an exaggerated indication of the shape of the figured surface, and Figures 2, 3 and 4 are views similar to Figure 1a of three modified arrangements.

Numerical data for these examples (Example I corresponding to Figures 1 and 1a, and Examples II, III and IV respectively to Figures 2, 3 and 4) are given in the following tables, in which $R_1 R_2 \ldots$ represent the radii of curvature of the individual surfaces counting from the front, the positive sign indicating that the surface is convex to the front and the negative sign that it is concave thereto, $D_1 D_2 \ldots$ represent the axial thicknesses of the individual elements, and $S_1 S_2$ represent the axial air separations between the components. The tables also give the mean refractive indices $n_D$ for the D-line and the Abbé V numbers of the materials used for the various elements. The shape of the aspherical surface in each example is defined by tabulating the coordinates of the meridian curve of the surface, the $x$-coordinate representing the radial distance from the optical axis and the $y$-coordinate the distance in the direction of the optical axis from the transaxial plane through the vertex of the surface, the positive sign indicating that the point lies to the rear of the transaxial plane.

EXAMPLE I

| Radius | Thickness or Air Separation | Refractive Index $n_D$ | Abbé V Number |
|---|---|---|---|
| $R_1$ Figured plane surface | | | |
| | $D_1$ .100 | 1.518 | 60.3 |
| $R_2$ —5.180 | | | |
| | $S_1$ .730 | | |
| $R_3$ +3.333 | | | |
| | $D_2$ .130 | 1.613 | 59.3 |
| $R_4$ — .8333 | | | |
| | $D_3$ .080 | 1.701 | 30.2 |
| $R_5$ —2.057 | | | |
| | $S_2$ .010 | | |
| $R_6$ +1.538 | | | |
| | $D_4$ .150 | 1.613 | 59.3 |
| $R_7$ — .8333 | | | |
| | $D_5$ .080 | 1.701 | 30.2 |
| $R_8$ —2.174 | | | |

Coordinates of figured plane surface $R_1$

| $x$ | $y$ | $x$ | $y$ |
|---|---|---|---|
| .04 | +.00005 | .26 | +.00091 |
| .10 | +.00027 | .28 | +.00084 |
| .15 | +.00055 | .30 | +.00070 |
| .20 | +.00082 | .32 | +.00047 |
| .22 | +.00089 | .34 | +.00015 |
| .24 | +.00093 | .35 | —.00006 |

In this example, the equivalent focal length of the rear member comprising the two doublets is taken as the unit. The distance from the aspherical surface $R_1$ to the projection screen should be 7.548 and the distance from the rear surface $R_8$ to the object (the target of the cathode ray tube) should be .8777, the objective giving a magnification 17.5 for a relative aperture F/1.4. The objective is designed for use with a curved target surface, which is concave towards the objective and has a radius of curvature 1.35. The total angular field covered is of the order of 32 degrees.

The aspherical surface is slightly convex towards the front at the axis with radius of curvature approximately 16.5, and reaches its maximum deviation from the tangent plane at the axial point at a radius of about .24, such maximum deviation being only about .00093. At the marginal radius of about .35, the deviation from the tangent plane is almost zero. The departure from a plane surface is only slight.

The remaining examples differ from Example I solely in respect of the simple front member, and employ exactly the same rear member. The surface $R_1$ in each of these examples consists of a figured spherical surface convex to the front, the front member being made of the same material as in Example I.

EXAMPLE II

Coordinates of figured spherical surface $R_1$

| $x$ | $y$ | $x$ | $y$ |
|---|---|---|---|
| .00 | +.00000 | .20 | +.00366 |
| .02 | +.00004 | .22 | +.00434 |
| .04 | +.00016 | .24 | +.00503 |
| .06 | +.00036 | .26 | +.00573 |
| .08 | +.00064 | .28 | +.00643 |
| .10 | +.00099 | .30 | +.00712 |
| .12 | +.00140 | .32 | +.00778 |
| .14 | +.00189 | .34 | +.00840 |
| .16 | +.00243 | .35 | +.00869 |
| .18 | +.00303 | | |

EXAMPLE III

Coordinates of figured spherical surface $R_1$

| $x$ | $y$ | $x$ | $y$ |
|---|---|---|---|
| .00 | +.00000 | .20 | +.00467 |
| .02 | +.00005 | .22 | +.00555 |
| .04 | +.00020 | .24 | +.00648 |
| .06 | +.00046 | .26 | +.00743 |
| .08 | +.00080 | .28 | +.00840 |
| .10 | +.00124 | .30 | +.00938 |
| .12 | +.00177 | .32 | +.01035 |
| .14 | +.00238 | .34 | +.01130 |
| .16 | +.00308 | .35 | +.01177 |
| .18 | +.00384 | | |

EXAMPLE IV

Coordinates of figured spherical surface $R_1$

| $x$ | $y$ | $x$ | $y$ |
|---|---|---|---|
| .00 | +.00000 | .20 | +.00567 |
| .02 | +.00006 | .22 | +.00677 |
| .04 | +.00024 | .24 | +.00793 |
| .06 | +.00055 | .26 | +.00913 |
| .08 | +.00096 | .28 | +.01037 |
| .10 | +.00149 | .30 | +.01164 |
| .12 | +.00213 | .32 | +.01292 |
| .14 | +.00287 | .34 | +.01421 |
| .16 | +.00372 | .35 | +.01484 |
| .18 | +.00465 | | |

These three examples differ from one another and from Example I primarily in that the aspherical surface (and likewise also the rear surface of the member) has different amounts of overall curvature, to give substantially the same degree of correction for the objective working at slightly different conjugates and with slightly different separations from the rear member.

Thus, whereas in Example I the aspherical surface approximates to a plane surface, that of Example II approximates to a spherical surface of radius about +7.05, that of Example III to a spherical surface of radius about +5.2, and that of Example IV to a spherical surface of radius about +4.1. The radius of curvature of the rear surface of the member is —5.18 in Example I, —19.91 in Example II, ∞ in Example III and +19.91 in Example IV.

What I claim as my invention and declare to secure by Letters Patent is:

1. An optical objective, corrected for spherical and chromatic aberrations, coma and astigmatism, and comprising a rear member consisting of a pair of achromatic doublets separated from one another by an air space whose axial length lies between zero and .10 times the equivalent focal length of the rear member, and a front member in the form of a simple element having one surface slightly aspherical axially separated from the rear member by an air space lying between .40 and 1.20 times such equivalent focal length, the simple front member in the neighbourhood of the optical axis being convergent with a focal length greater than 4.0 times that of the rear member, whilst its aspherical surface is such that the deviation from the mean true spherical surface is at no point greater than .01 times the equivalent focal length of the rear member.

2. An optical objective as claimed in claim 1, in which the cooperating internal contact surfaces in each of the two doublets are concave to the front.

3. An optical objective as claimed in claim 1, in which each of the two doublets consists of a meniscus divergent element located behind a biconvex convergent element made of a material which has lower mean refractive index than that of the associated divergent element and whose Abbé V number exceeds that of the associated divergent element by more than 20.

4. An optical objective, corrected for spherical and chromatic aberrations, coma and astigmatism, and comprising a rear member consisting of a pair of achromatic doublets separated from one another by an air space whose axial length lies between zero and .10 times the equivalent focal length of the rear member, and a front member in the form of a simple element made of a material whose Abbé V number is not less than 45 and having one surface slightly aspherical, such front member being axially separated from the rear member by an air space lying between .40 and 1.20 times such equivalent focal length, whilst its aspherical surface is such that the deviation from the mean true spherical surface is at no point greater than .01 times the equivalent focal length of the rear member.

5. An optical objective as claimed in claim 4, in which the cooperating internal contact surfaces in each of the two doublets are concave to the front.

6. An optical objective as claimed in claim 4, in which each of the two doublets consists of a biconvex convergent element in front of a meniscus divergent element made of a material having higher mean refractive index and lower Abbé V number than that of the associated convergent element.

7. An optical objective, corrected for spherical and chromatic aberrations, coma and astigmatism, and comprising a rear member consisting of a pair of achromatic doublets separated from one another by an air space whose axial length lies between zero and .10 times the equivalent focal length of the rear member, and a front member in the form of a simple element made of a material whose Abbé V number is not less than 45 and having one surface consisting of a figured plane surface, the maximum deviation from the true plane surface being less than .01 times the equivalent focal length of the rear member such front member being axially separated from the rear member by an air space lying between .40 and 1.20 times such equivalent focal length, whilst in the neighbourhood of the optical axis the front member is convergent with a focal length greater than 4.0 times that of the rear member.

8. An optical objective as claimed in claim 7, in which the cooperating internal contact surfaces in each of the two doublets are concave to the front.

9. An optical objective as claimed in claim 7, in which each of the two doublets consists of a meniscus divergent element located behind a biconvex convergent element made of a material which has lower mean refractive index than that of the associated divergent element and whose Abbé V number exceeds that of the associated divergent element by more than 20.

10. An optical objective having numerical data substantially as set forth in the following table:

| Radius | Thickness or Air Separation | Refractive Index $n_D$ | Abbé V Number |
|---|---|---|---|
| $R_1$ Figured plane surface | | | |
| | $D_1$ .100 | 1.518 | 60.3 |
| $R_2$ −5.180 | $S_1$ .730 | | |
| $R_3$ +3.333 | $D_2$ .130 | 1.613 | 59.3 |
| $R_4$ − .8333 | $D_3$ .080 | 1.701 | 30.2 |
| $R_5$ −2.057 | $S_2$ .010 | | |
| $R_6$ +1.538 | $D_4$ .150 | 1.613 | 59.3 |
| $R_7$ − .8333 | $D_5$ .080 | 1.701 | 30.2 |
| $R_8$ −2.174 | | | |

Coordinates of figured plane surface $R_1$

| $x$ | $y$ | $x$ | $y$ |
|---|---|---|---|
| .04 | +.00005 | .26 | +.00091 |
| .10 | +.00027 | .28 | +.00084 |
| .15 | +.00055 | .30 | +.00070 |
| .20 | +.00082 | .32 | +.00047 |
| .22 | +.00089 | .34 | +.00015 |
| .24 | +.00093 | .35 | −.00006 | wherein $R_2$ $R_3$ ... represent the radii of curvature of the individual surfaces counting from the front, the positive sign indicating that the surface is convex to the front and the negative sign that it is concave thereto, $D_1$ $D_2$ ... represent the axial thicknesses of the various elements and $S_1$ $S_2$ represent the axial air separations between the components, the shape of the figured plane surface $R_1$ being defined by the coordinates of the meridian curve of the surface, the $x$-coordinate representing the radial distance from the optical axis and the $y$-coordinate the distance in the direction of the optical axis from the transaxial plane through the vertex of the surface, the positive sign indicating that the point lies to the rear of the transaxial plane and the negative sign that it is in front thereof.

ARTHUR COX.

REFERENCES CITED

The following references are of record in the file of this patent:

UNITED STATES PATENTS

| Number | Name | Date |
|---|---|---|
| 697,959 | Abbe | Apr. 22, 1902 |
| 880,208 | Germain et al. | Feb. 25, 1908 |
| 934,579 | Straubel et al. | Sept. 21, 1909 |
| 1,347,673 | Bishop | July 27, 1920 |
| 1,479,229 | Erfle | Jan. 1, 1924 |
| 2,100,291 | Lee | Nov. 23, 1937 |
| 2,158,202 | Schade | May 16, 1939 |
| 2,172,775 | Schmidt et al. | Sept. 12, 1939 |
| 2,394,635 | Reiss | Feb. 12, 1946 |